Oct. 21, 1930. J. M. AXTELL 1,779,267
LUBRICATING DEVICE FOR WINDMILLS
Filed Sept. 9, 1927 3 Sheets-Sheet 1
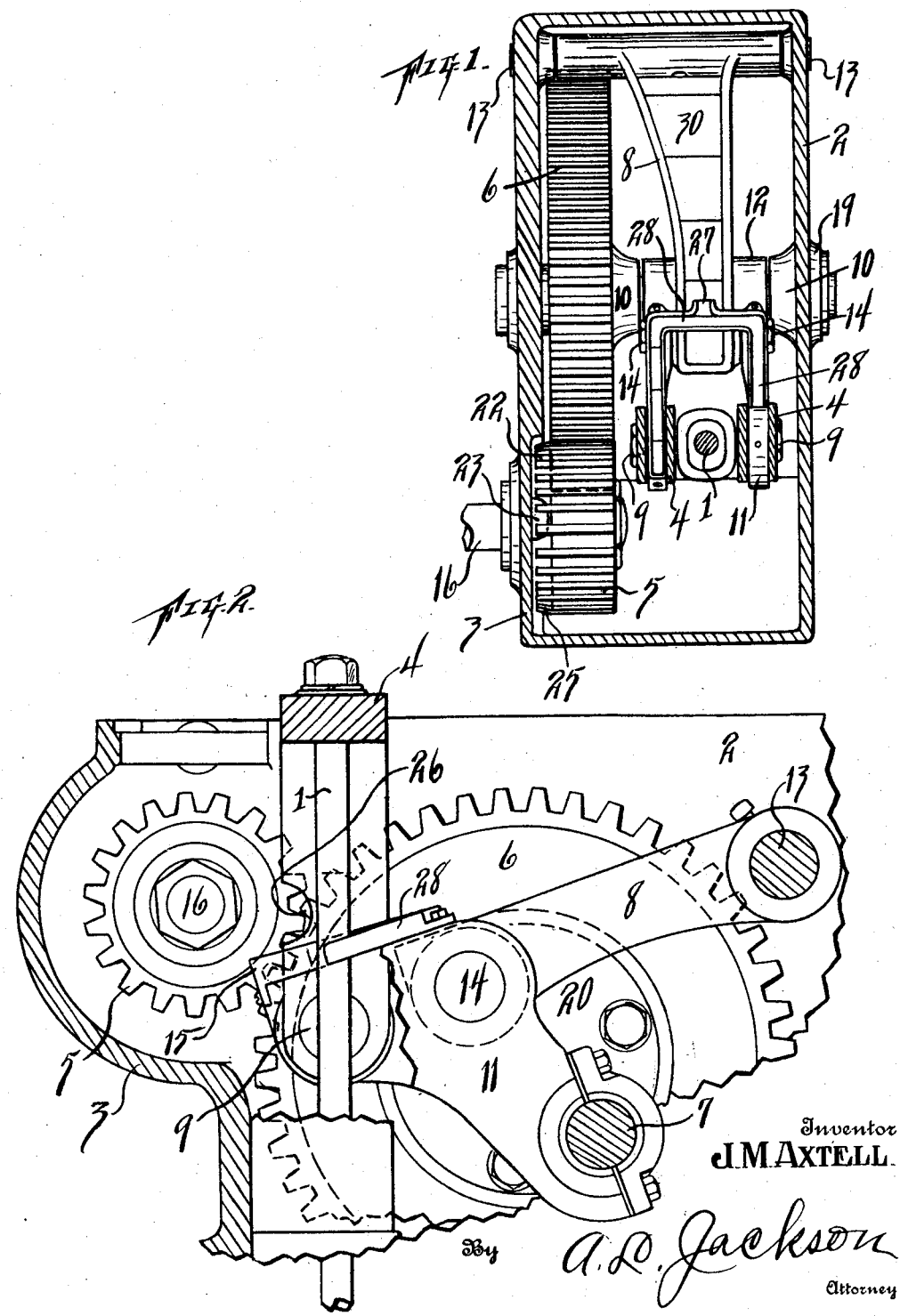
Inventor
J.M. AXTELL
By A. L. Jackson
Attorney

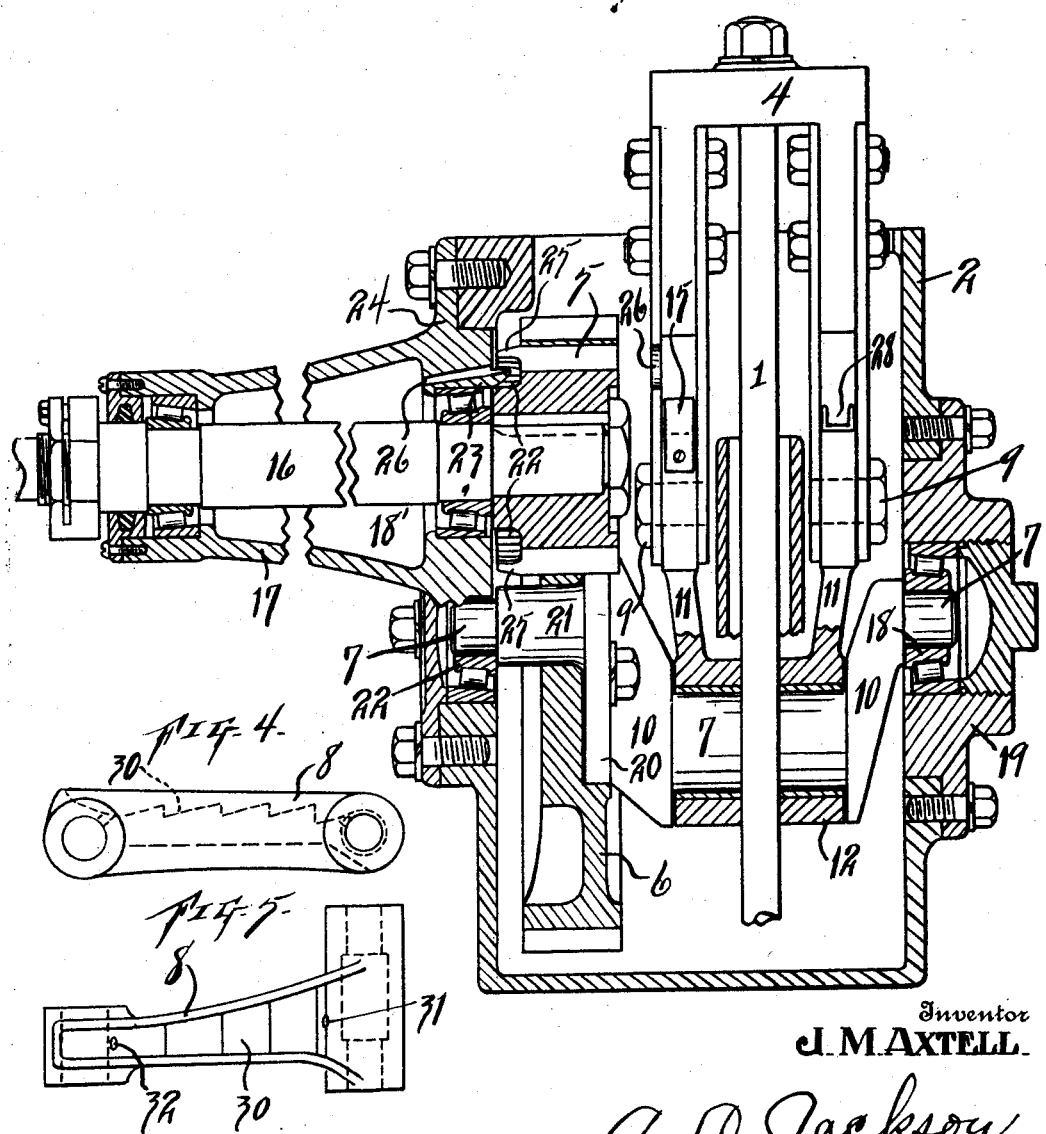

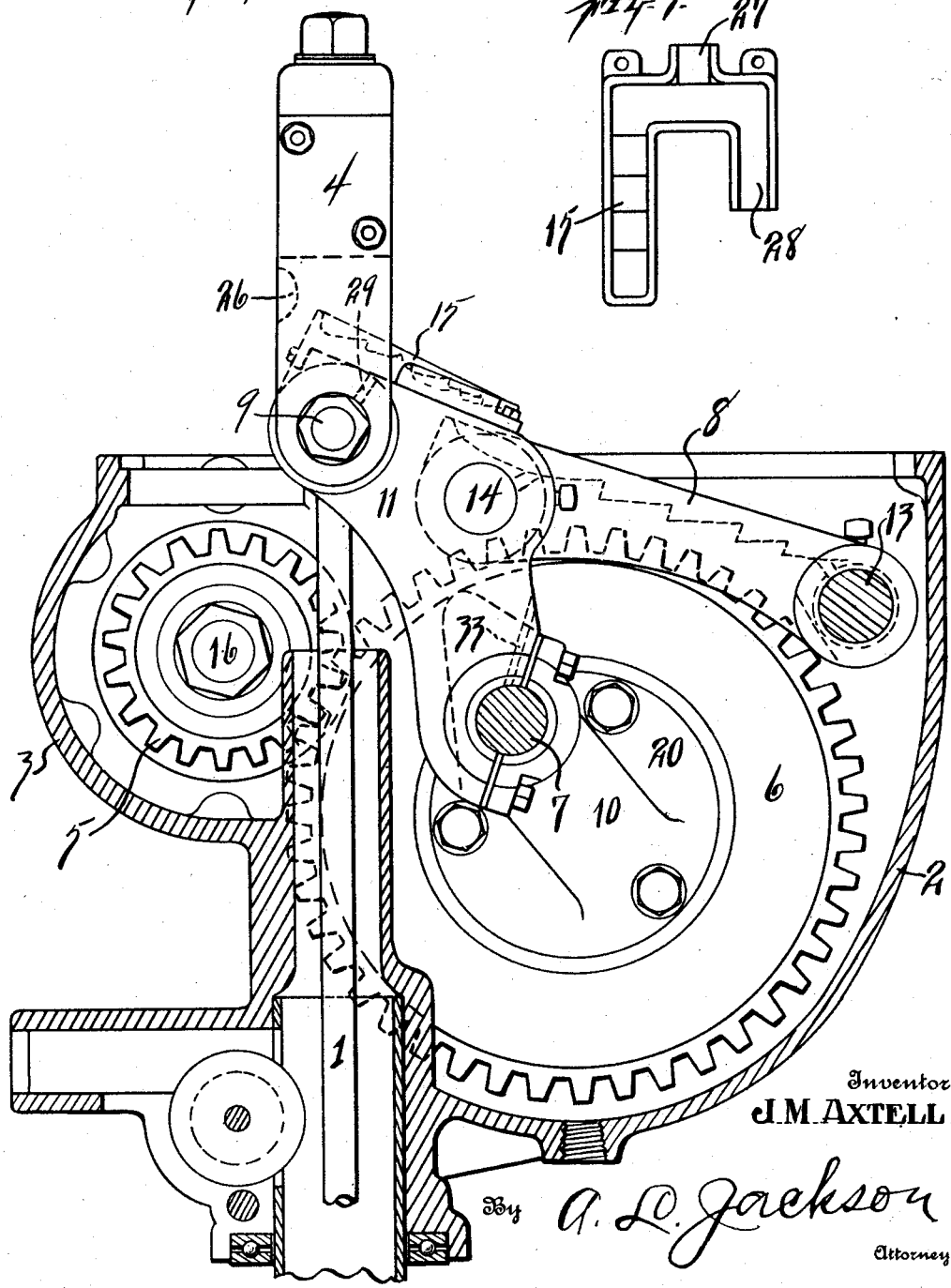

Patented Oct. 21, 1930

1,779,267

UNITED STATES PATENT OFFICE

JAY M. AXTELL, OF FORT WORTH, TEXAS

LUBRICATING DEVICE FOR WINDMILLS

Application filed September 9, 1927. Serial No. 218,446.

My invention relates to lubricating means for windmills and more particularly to means for automatically lubricating the driving mechanism of windmills and other machinery; and the object is to provide practical and efficient means for keeping the gearing and bearings therefor lubricated continuously and to provide means for automatically distributing the lubricating material. One advantage of the improvements is that there is a great saving in lubricating material and the lubrication does not require the attention of an operator to keep the lubrication going while the windmill or other machine is in operation. Other objects and advantages will be fully explained in the following description and the invention will be more particularly pointed out in the claims.

Reference is had to the accompanying drawings which form a part of this application.

Fig. 1 is a plan view of the gearing and lubricating means for the working parts of the windmill, the cross-head and part of the casing being shown in section.

Fig. 2 is a detail view of the oil distributing means, showing how the oil is dipped and started to the distributing devices.

Fig. 3 is a vertical section in part of the operating means and a vertical section of the crank case.

Fig. 4 is a side elevation of the walking beam.

Fig. 5 is a plan view of the same.

Fig. 6 is a vertical section in part of the dip and splash mechanism.

Fig. 7 is a plan view of the main distributer.

Similar characters of reference are used to indicate the same parts throughout the several views.

An upright casing 2 is provided with a curved enlargement 3 and this casing houses the gearing and other mechanism for actuating the plunger rod 1. A cross-head 4 carries the plunger rod 1 which is to be reciprocated vertically. A power shaft 16 drives a pinion 5. This power shaft is journaled in a bearing sleeve 17 which is bolted to the casing 2. The sleeve 17 forms a receptacle 18′ for containing a lubricant for the bearings of the shaft 16. The casing 2 contains the supply of lubricant. The pinion 5 drives a cog-wheel 6 which dips into the lubricant in casing 2. The cog wheel 6 drives the crank-shaft 7. The crank-shaft 7 is provided with arms 10, one of which is journaled in a bearing 18 which is mounted in a boss 19. The other arm 10 has an integral disk 20 which is countersunk in the face of the cog wheel 6 and bolted thereto. A journal 21 is integral with disk 20 and journaled in a bearing 22 which is supported between the juncture of the sleeve 17 and the casing 2.

The cog wheel 6 dips up lubricant and delivers the lubricant to the pinion 5. Provision is made for transferring lubricant from the pinion 5 to the receptacle 18. An annular cavity 22 is cored out in the face of the pinion 5. An oil receiving nozzle 23 is formed on the inner face of the sleeve base 24 and projects into the cavity 22. The pinion 5 has a hub extension in which the cavity 22 is formed and each tooth of pinion 5 has an extension 25 which is inclined for the purpose of throwing lubricant into the nozzle 23. A duct 26 through the sleeve base 24 delivers the lubricant to the receptacle 18. During operation the pinion 5 is constantly throwing lubricant on the nozzle 23 by means of the tooth extensions 25.

The cog wheel 6 and the pinion 5 also gather lubricant and distribute it to the other working parts as follows: Link bars 11 are connected to the crank shaft 7 by means of a bearing 12. Link bars 11 are pivotally connected to the cross-head 4 by pivot bolts 9. A walking beam 8 is pivotally connected to the casing 2 by a pivot bolt 13. The walking beam 8 is pivotally connected to the link bars 11 by means of a pivot bolt 14. With such construction, the link bars 11 oscillate from the position shown in Fig. 6 to the position shown in Fig. 2 continually during operation. The main oil distributer 15 is an approximately U-shaped trough and is attached to the link bars 11. When the distributer 15 is carried to the lower position, as shown in Fig. 2, it receives a charge of oil or lubricant from the gear wheels 5 and 6. One arm of the distributer 15 extends through the cross-head 4 and one part of the cross-head is cut-out at 26 so that the lubricant will be dropped into the distributer 15 from the gear wheels 5 and 6. Fig. 2 shows the position of the distributer 15 when receiving lubricant from the wheels 5 and 6. Fig. 6 shows the position of the distributer 15 when delivering lubricant to the walking beam 8. The distributer 15 has a cut-out or spout 27 in the rear end to let lubricating material or oil fall into the trough formed in the upper side of the walking beam 8. One arm 28 of the distributer 15 delivers lubricant through a duct 29 to one bolt 9 of the link bar connections and the gear wheels 5 and 6 lubricate the other bolt 9 by dipping and splashing oil on the adjacent bolt 9. The bottom of the trough in the distributer 15 is stepped to prevent all the oil from running out of the distributer when the distributer descends to the position shown in Fig. 2.

The upper side of the walking beam 8 is formed into a trough for distributing the lubricant. The trough 30 is stepped in the bottom to retard the flow of the lubricant and to maintain a supply of lubricant therein. An opening 31 in the bottom 30 makes provision for feeding lubricant to the pivot bolt 13. An opening 32 in the bottom 30 makes provision for lubricating the pivot bolt 14 when the walking beam goes down to the position shown in Fig. 2. A duct 33 conducts lubricant down through to the crank-shaft journal and bearings therefor. With the mechanism above shown, a supply of lubricant is delivered to the distributer 15 at every descent of the cross-head 4. The distributer 15 delivers lubricant to the trough 30 in the walking beam and the arm 28 of the distributer lubricates the bolt 9 through the duct 29. Any overflow lubricant will be caught in the case 2.

What I claim, is,—

1. In a driving mechanism including a power shaft and a crank shaft and gear wheels and a housing therefor; means for lubricating said gearing and shafts, said housing being adapted to contain lubricating material and one of said gear wheels running in the lubricant and dipping up lubricant and lubricating the other gear wheel, a distributer attached to and actuated by the arms of said crank-shaft and receiving lubricant from said gearing, a walking beam actuated by and co-operating with said crank arms and a trough formed in said walking beam and receiving lubricant from said distributer and provided with a stepped bottom, said distributer and walking beam trough distributing lubricant to the bearings of said arms and gear wheels.

2. In a driving mechanism including a power shaft and a crank shaft with arms and link bars therefor and gear wheels and a housing for said driving mechanism; means for lubricating said gearing and shafts, said housing being adapted to contain a supply of lubricating material and one of said gear wheels running in and dipping up lubricating material and supplying the same to the other gear wheel, a distributer attached to said link bars and receiving lubricating material from said gear wheels, and a walking beam pivotally connected to said casing and pivotally connected to said link bars and having a trough formed thereon for receiving lubricating material from said distributer and delivering the same to the working parts of driving mechanism.

3. In a driving mechanism provided with a power shaft and a crank shaft and working parts; means for lubricating said shafts and working parts consisting of a walking beam having a trough provided with a retarding stepped bottom in its upper face and pivotally connected to said crank shaft and a distributer operatively connected to said crank shaft and actuated thereby for delivering lubricating material to said trough and to other working parts of said driving mechanism.

4. In a driving mechanism provided with a power shaft and a crank shaft and bearings therefor and other working parts; means for lubricating said driving mechanism comprising a walking beam pivotally connected to said crank shaft and provided with a trough having a stepped retarding bottom in its upper face for distributing lubricating material to said bearings and a distributer for delivering lubricating material to said trough and having a receiving member and a delivering member and operatively connected to said crank shaft.

5. In a driving mechanism provided with a power shaft and a crank shaft and gearing operatively connecting said shafts and bearings for said shafts and other working parts; means for lubricating said driving mechanism comprising a casing for containing a supply of lubricating material and constituting a frame for said mechanism, a walking beam pivotally connected to said casing and operatively connected to said crank shaft and provided with a trough in its upper face, steps formed in the bottom of said trough for retarding the supply of oil, a distributer operatively connected to said crank shaft and having a discharge nozzle to deliver lubricating material to said trough and having a receiving member and a discharge member, said gearing being adapted to dip into the lubricating material in said casing and to deliver the lubricating material to said distributer receiving member.

6. In a driving mechanism including a crank shaft and link bars operatively connected to said crank shaft and to a crosshead for actuating the cross-head; means for lubricating said driving mechanism comprising a walking beam pivotally mounted at one end and operatively connected to said link bars at the other end and having a trough in its upper side and a distriubuter mounted on said link bars and adapted to deliver lubricating material to said trough, said driving mechanism having gearing adapted to deliver lubricating material to said distributer.

7. In a driving mechanism provided with a casing and a crank shaft and link bars operatively connected to the crank shaft and to a cross-head for actuating the cross-head; means for lubricating said driving mechanism comprising a walking beam pivoted at one end to said casing and operatively connected to said link bars and provided with a trough in its upper face, a distributer mounted on said link bars and adapted to deliver lubricating material to said trough and to one side of said cross-head, said driving mechanism having gearing adapted for delivering lubricating material to said distributer.

8. In a driving mechanism provided with a casing and a power shaft and a crank shaft and bearings for said shafts and link bars operatively connected to said crank shaft and to a cross-head for operating the cross-head; a walking beam pivoted at one end to said casing and operatively connected at the other end to said link bars and provided with a trough in its upper face, a distributer mounted on said link bars and adapted to deliver lubricating material to said trough and to one side of said crosshead, said driving mechanism having a pinion and a cog wheel adapted to deliver lubricating material to said distributer and said pinion having extension teeth for delivering lubricating material to the bearings of said power shaft.

In testimony whereof, I set my hand, this 6th day of September, 1927.

JAY M. AXTELL.